US008085647B2

(12) United States Patent
Cho et al.

(10) Patent No.: US 8,085,647 B2
(45) Date of Patent: Dec. 27, 2011

(54) OPTICAL RECORDING/REPRODUCING APPARATUS HAVING LABEL PRINTER AND METHOD FOR PRINTING LABELS ON OPTICAL DISK

(75) Inventors: Won-ik Cho, Seoul (KR); Ki-won Yoon, Suwon-si (KR); Young-won Lee, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 977 days.

(21) Appl. No.: 11/591,540

(22) Filed: Nov. 2, 2006

(65) Prior Publication Data

US 2007/0097158 A1 May 3, 2007

(30) Foreign Application Priority Data

Nov. 3, 2005 (KR) ........................ 10-2005-0104929

(51) Int. Cl.
*B41J 3/00* (2006.01)

(52) U.S. Cl. .................. 369/273; 369/30.04; 369/30.32; 347/39; 347/105; 347/222; 347/225; 400/23

(58) Field of Classification Search .................. 347/187, 347/172, 175, 39, 105, 222, 225; 369/273, 369/30.04, 30.32; 400/23
See application file for complete search history.

(56) References Cited

U.S. PATENT DOCUMENTS 5,317,337 A * 5/1994 Ewaldt .............................. 347/2
6,019,151 A * 2/2000 Wen et al. ..................... 156/387
6,074,031 A 6/2000 Kahle
6,148,722 A * 11/2000 Hagstrom ....................... 101/35
6,396,526 B1 * 5/2002 Sung et al. .................... 347/178
6,580,444 B1 * 6/2003 Drynkin et al. ............... 347/171
6,771,297 B2 * 8/2004 Bronson ....................... 347/224
7,064,774 B2 * 6/2006 Revelles ....................... 347/215
7,226,225 B2 * 6/2007 Mochizuki et al. ...... 400/120.01
(Continued)

FOREIGN PATENT DOCUMENTS

JP 6-333326 12/1994
(Continued)

OTHER PUBLICATIONS

Machine Translation of Japanese Publication 2002334553 by Ando Masahiro on Nov. 22, 2002.*

(Continued)

*Primary Examiner* — Wayne Young
*Assistant Examiner* — Linh Nguyen
(74) *Attorney, Agent, or Firm* — NSIP Law

(57) ABSTRACT

An optical recording/reproducing apparatus having a label printer for printing labels on an optical disk and a method for printing labels on an optical disk. The optical recording/reproducing apparatus includes an optical disk drive unit recording and reproducing information on a recording surface of an optical disk, a label printer module printing labels on a label surface of the optical disk using thermal transfer, and a controller controlling a label printing operation of the optical disk drive unit and the label printer module, wherein the label printer module includes a ribbon cartridge in which a thermal transfer ribbon to which dyes are attached is wound and which is disposed to face the label surface of the optical disk mounted in the optical disk drive unit, and a thermal printhead transferring the dyes attached to the thermal transfer ribbon onto the label surface of the optical disk using thermal transfer.

24 Claims, 6 Drawing Sheets

U.S. PATENT DOCUMENTS

2002/0122378 A1* 9/2002 Kubo .......................... 369/273
2002/0167582 A1* 11/2002 Onozato et al. ............... 347/219
2004/0080606 A1* 4/2004 Ishida et al. .................. 347/213
2005/0151825 A1* 7/2005 Sukigara et al. .............. 347/225
2005/0169684 A1* 8/2005 Mochizuki ...................... 400/23
2005/0195268 A1* 9/2005 Russ ............................. 347/171
2007/0097158 A1* 5/2007 Cho et al. ......................... 347/2
2007/0257981 A1* 11/2007 Hitz et al. ..................... 347/237
2008/0150985 A1* 6/2008 Ikemoto et al. ................. 347/11

FOREIGN PATENT DOCUMENTS

JP 2001-101825 4/2001
JP 2002-46305 2/2002
JP 2003-1811 1/2003
JP 2003-72155 3/2003
JP 2004-171725 6/2004

OTHER PUBLICATIONS

Machine Translation of Japanese Publication 2003001811 by Shima Kazunmobu on Jan. 8, 2003.*

Japan publication No. 2002334553 by Ando Marashiro in Nov. 22, 2002.*

* cited by examiner

OPTICAL RECORDING/REPRODUCING APPARATUS HAVING LABEL PRINTER AND METHOD FOR PRINTING LABELS ON OPTICAL DISK

CROSS-REFERENCE TO RELATED APPLICATIONS

This application claims the benefit of Korean Patent Application No. 10-2005-0104929, filed on Nov. 3, 2005, in the Korean Intellectual Property Office, the disclosure of which incorporated herein in its entirety by reference.

BACKGROUND OF THE INVENTION

1. Field of the Invention

The present invention relates to an optical recording/reproducing apparatus having a label printer for printing labels on an optical disk and a method for printing labels on an optical disk. More particularly, to an optical recording/reproducing apparatus having a label printer which prints labels directly on a label surface of an optical disk using thermal transfer and a method for printing labels on an optical disk.

2. Description of the Related Art

In general, a recording surface on/from which information is recorded/reproduced is formed on one surface of an optical disk such as a CD, DVD, blu-ray disks (BD) or HD-DVD. A label surface on which pictures, characters, or symbols for identifying the optical disk can be marked is formed on a surface opposite to the recording surface of the optical disk. When recording predetermined information on the optical disk, a user can make a predetermined mark on the label surface of the optical disk so that the optical disk can be identified from an optical disk on which other information is recorded.

Conventional methods for making a predetermined mark on the label surface of the optical disk include a method for directly writing a predetermined mark using a pen or marker. However, using this method requires that a physical force be applied to the recording surface of the optical disk. Thus, when information is reproduced from the optical disk, errors may be generated. In addition, it is not easy to include much information in the mark since the manner of expressing the mark is limited.

Conventional methods for making a predetermined mark on the label surface of the optical disk further include a method for printing labels on a sticker-shaped sheet of paper using an external printer, and then manually detaching the sticker on which the labels are printed and directly attaching the sticker onto a label surface of an optical disk. However, in this method, the weight of the optical disk is changed. Thus, it may be difficult to reproduce information recorded from the optical disk. Furthermore, if the sticker is not precisely attached in the center of the optical disk, an eccentricity or deflection may easily occur, when the optical disk is rotated while information is being recorded/reproduced on the optical disk. In addition, the sticker may be separated from the optical disk while the optical disk is mounted on a recording/reproducing apparatus.

A variety of conventional label printers which print pictures, characters, or symbols edited by a user on a label surface of an optical disk have been developed.

For example, U.S. Pat. No. 6,074,031 discloses a label printer installed in an optical disk drive, and having an ink-jet or bubble-jet head to print pictures, characters, or symbols on a label surface of an optical disk using an ink-jet or bubble-jet method. In this method, labels are printed by referring to a position signal on a top surface of the optical disk while the optical disk mounted in the optical disk drive is rotated. However, in this case, the entire structure of the optical disk drive is complicated and the size thereof is large. Thus, it is difficult to implement the label printer for use in a desktop personal computer (PC) or laptop PC. In addition, since the labels are printed while the optical disk is rotated, information on the position of the optical disk is required. In addition, disks in which only an additional ink-absorbing layer is formed on a label surface of an optical disk should be used.

In another conventional label printing method, a laser device for printing labels is installed in an optical disk drive and labels are printed on an optical disk by heating a thermal-sensitive layer formed on a label surface of the optical disk using the laser device. However, even in this method, only a specific optical disk having a label surface on which the thermal-sensitive layer is formed should be used and color printing cannot be realized. In addition, it takes at least 30 minutes to perform a printing operation. Furthermore, since the temperature of the optical disk partially rises to 90°-120° when labels are printed, information recorded on a recording layer of the optical disk may be damaged. In addition, this method may adversely affect the function of the laser device for recording/reproducing information on/from the optical disk.

Furthermore, when using the above-mentioned conventional methods, printed labels cannot be deleted or re-recorded.

SUMMARY OF THE INVENTION

Accordingly, it is an aspect of the present invention to provide a method for printing labels on an optical disk by which information recorded on the optical disk is not damaged and the function of an optical disk drive is not adversely affected, and an optical recording/reproducing apparatus having a label printer using the method.

Further, it is another aspect of the present invention to provide a method for printing labels on an optical disk by which labels can be printed in black and white, and colors on a label surface of an optical disk, without the need to use a specific optical disk having a label surface on which an additional layer is formed, and an optical recording/reproducing apparatus having a label printer using the method.

Further, it is another aspect of the present invention to provide a method for printing labels on an optical disk by which a time for printing labels is reduced and label printing can also be performed repeatedly, after label printing has been performed once, and an optical recording/reproducing apparatus having a label printer using the method.

Additional aspects and/or advantages of the invention will be set forth in part in the description which follows and, in part, will be apparent from the description, or may be learned by practice of the invention.

The foregoing and/or other aspects of the present invention are achieved by providing an optical recording/reproducing apparatus having a label printer, the optical recording/reproducing apparatus including an optical disk drive unit recording/reproducing information on a recording surface of an optical disk, a label printer module printing labels on a label surface of the optical disk using thermal transfer, and a controller controlling a label printing operation of the optical disk drive unit and the label printer module. The label printer module includes a ribbon cartridge on which a thermal transfer ribbon to which dyes are attached is wound, and which is disposed to face the label surface of the optical disk mounted in the optical disk drive unit, and a thermal printhead transferring the dyes attached to the thermal transfer ribbon onto the label surface of the optical disk using thermal transfer.

The controller controls the optical disk drive unit to eject the mounted optical disk at a predetermined speed and controls the label printer module to print labels on the label surface of the optical disk. An ejecting speed of the optical disk may be controlled to coincide with a label printing speed of the label printer module.

The thermal transfer ribbon includes an undercoating layer region to absorb dyes, at least one dye region, and an overcoating layer region forming an overcoating layer on the label surface to protect the dyes transferred onto the label surface of the optical disk, and wherein the thermal transfer ribbon is formed in such a way that the undercoating layer region, the dye region, and the overcoating layer region are repeatedly formed along a longitudinal direction.

When the optical disk is initially ejected, the undercoating layer is transferred onto the label surface of the optical disk, at least one dye is sequentially transferred while the optical disk is repeatedly re-inserted and ejected, and the overcoating layer is transferred after the at least one dye has been sequentially transferred such that when the overcoating layer is transferred last, the optical disk may be completely ejected.

According to an aspect of the present invention, the at least one dye region includes a red dye region, a yellow dye region, and a blue dye region.

According to another aspect of the present invention, the thermal transfer ribbon includes at least one dye region and an overcoating layer region to protect the dyes transferred onto the label surface of the optical disk, and the thermal transfer ribbon is formed such that -the at least one dye region and the overcoating layer region are repeatedly formed along the longitudinal direction.

Whenever the optical disk is ejected once, dyes in one region are transferred onto the label surface of the optical disk, and ejecting and re-inserting of the optical disk is repeatedly performed up to a last dye region, and when the overcoating layer is transferred last, the optical disk may be completely ejected.

When labels are printed, the ribbon cartridge conveys the thermal transfer ribbon at a predetermined speed corresponding to a label printing speed of the labels.

The thermal transfer ribbon may be disposed between the thermal printhead and the label surface of the optical disk, and when labels are printed, the thermal printhead may press and heat the thermal transfer ribbon toward the label surface of the optical disk.

The thermal printhead includes a plurality of heating elements arranged perpendicular to a direction where the optical disk is inserted and ejected.

According to an embodiment of the present invention, a width of the thermal printhead is equal to a diameter of the optical disk.

According to another aspect of the present invention, there is provided a method of printing labels on a label surface of an optical disk mounted in an optical disk drive unit using thermal transfer in an optical recording/reproducing apparatus including a label printer module including a ribbon cartridge in which a thermal transfer ribbon to which dyes are attached is wound and a thermal printhead, and the optical disk drive unit recording/reproducing information on a recording surface of an optical disk, the method including ejecting the optical disk at a predetermined speed using the optical disk drive unit, and pressing and heating the thermal transfer ribbon toward the label surface of the optical disk using the thermal printhead and transferring dyes onto the label surface of the optical disk.

BRIEF DESCRIPTION OF THE DRAWINGS

The above and other aspects and advantages of the present invention will become apparent and more readily appreciated from the following description of the embodiments taken in conjunction with the accompanying drawings in which.

DETAILED DESCRIPTION OF THE PREFERRED EMBODIMENTS

Figure 1:
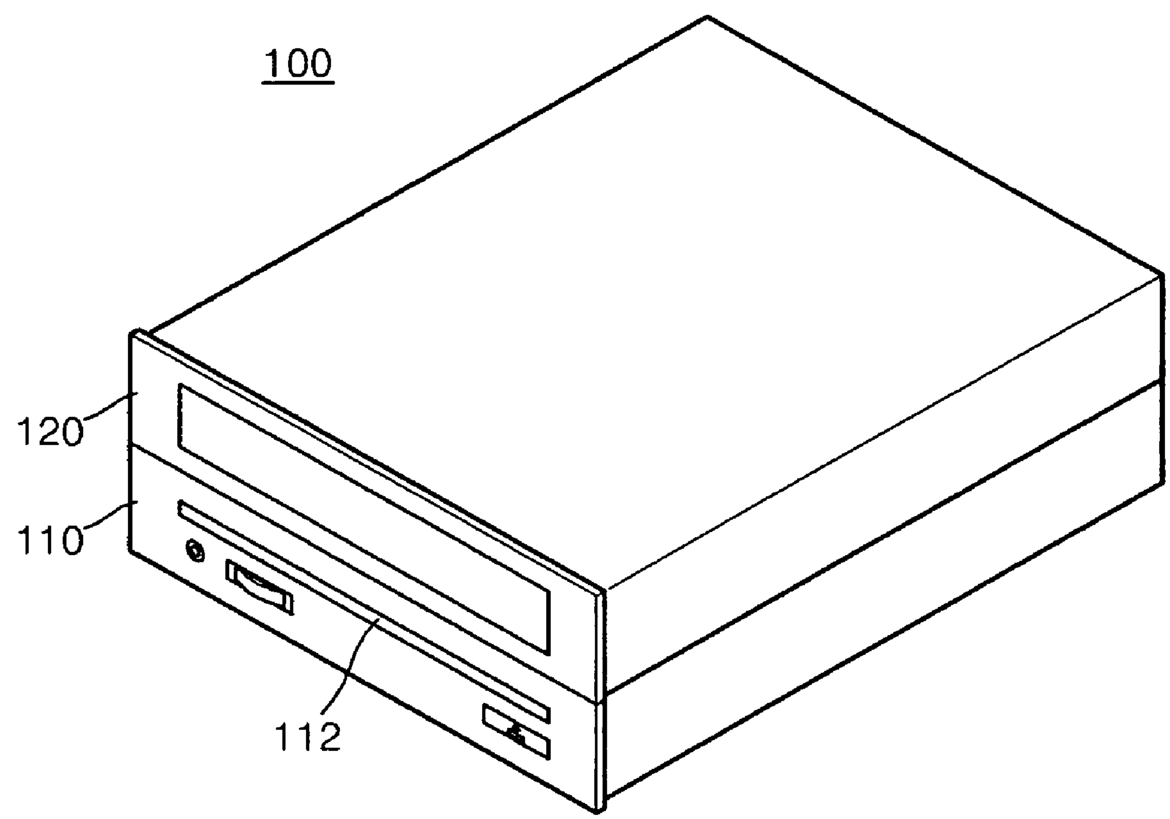
FIG. 1 is a perspective view illustrating an optical recording/reproducing apparatus having a label printer according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a perspective view illustrating an optical recording/reproducing apparatus 100 having a label printer for printing labels on an optical disk according to an embodiment of the present invention. The optical recording/reproducing apparatus 100 of FIG. 1 comprises an optical disk drive unit 110 for recording information on a recording surface of an optical disk or reproducing information recorded on the recording surface of the optical disk, and a label printer module 120 for printing labels on a label surface of the optical disk. According to an embodiment of the present invention, the label printer module 120 is disposed on the optical disk drive unit 110, however, the present invention is not limited to this structure and may vary accordingly.

In addition, a slot 112 into which the optical disk is inserted is formed in a front surface of the optical disk drive unit 110. In general, optical disk drives are classified into slot-in type optical disk drives and tray-type optical disk drives according to a method of loading an optical disk. As well-known, a tray-type optical disk drive has a structure in which a disk tray is inserted/ejected via a gear train actuated by a loading motor. In the case of the tray-type optical disk drive, when a user presses a button, the disk tray comes out from a main body of an optical disk drive unit, and when the user presses the button again after placing an optical disk on the disk tray, the disk tray with the optical disk moves inside the main body. In the case of a slot-in type optical disk drive, when a user inserts the optical disk into a slot in the front surface of an optical disk drive unit, a sensor installed at an inlet of the slot detects the optical disk, a conveying mechanism inside the slot operates by a loading motor and conveys the optical disk inside the main body. In the case of the optical disk drive unit 110, to reduce the entire thickness thereof, a slot-in type optical disk drive in which the optical disk is inserted into the slot 112 is used, as shown in FIG. 1, but a tray-type optical disk drive may also be used.

Figure 2:
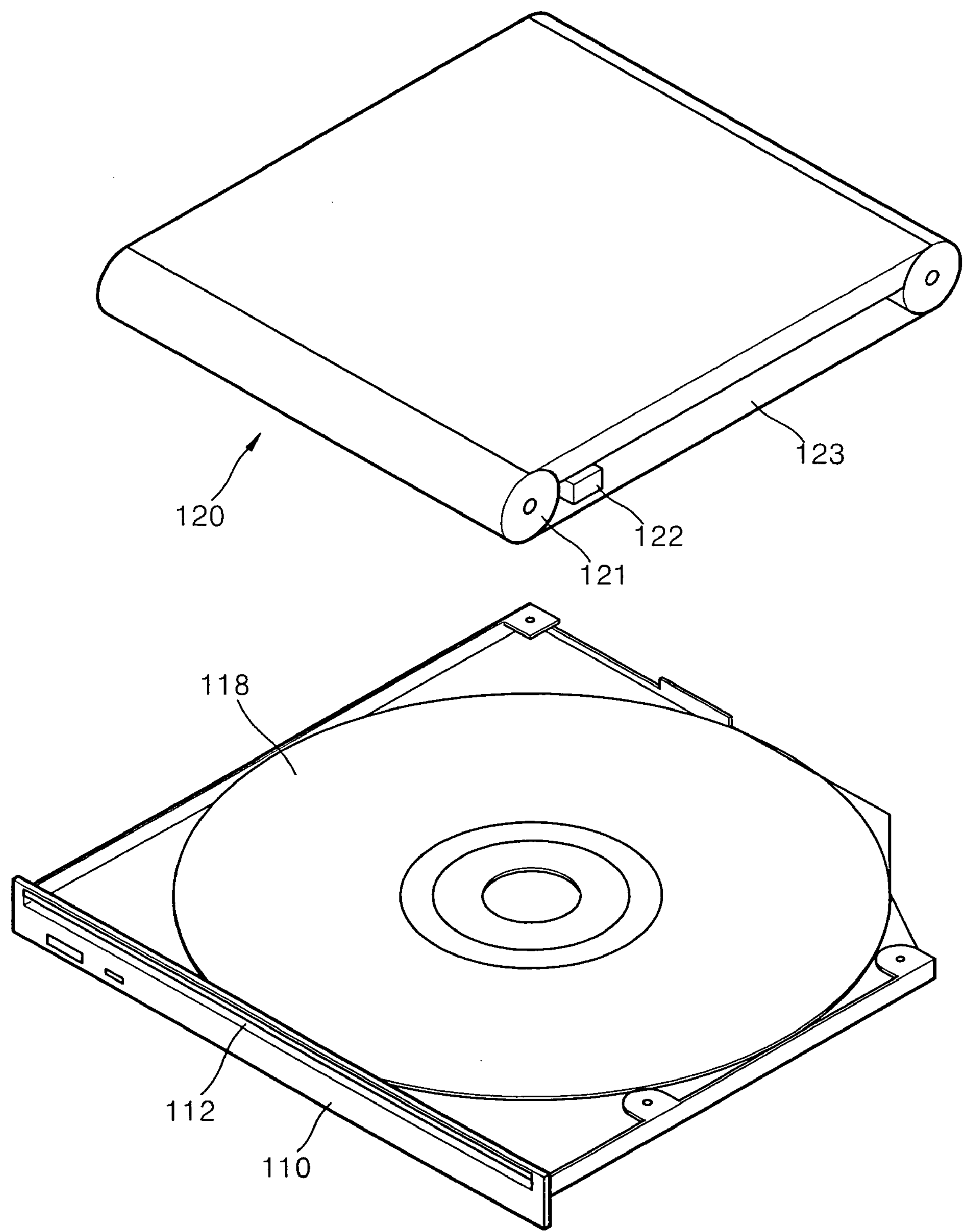
FIG. 2 is a schematic exploded perspective view of the optical recording/reproducing apparatus shown in FIG. 1.

FIG. 2 is a schematic exploded perspective view of the optical recording/reproducing apparatus 100 shown in FIG. 1. Referring to FIG. 2, an optical disk 118 is placed in the optical disk drive unit 110 with a recording surface facing the optical disk drive unit 110, and the label printer module 120 is disposed above the optical disk drive unit 110 to face a label surface of the optical disk 118. The optical disk drive unit 110 may include, for example, a loading device (not shown) for loading an optical disk using a slot-in or tray method, an optical pickup (not shown) for recording information or reading recorded information by radiating light onto the optical disk, and a driver (not shown) for driving the optical pickup and performing focusing and tracking control.

The label printer module 120 which faces the label surface of the optical disk 118 and prints labels on the label surface of the optical disk 118 may be disposed on a top surface of the optical disk drive unit 110. In an embodiment of the present invention, the label printer module 120 functions like a portable photo-printer which is directly connected to a digital camera and prints photos stored in the digital camera. That is, the label printer module 120 may print labels using thermal transfer by which dyes are transferred onto a printing medium by heating the dyes attached to a base film. To this end, as shown in FIG. 2, the label printer module 120 includes a ribbon cartridge 121 in which a thermal transfer ribbon 123 to which the dyes are attached is wound, and a thermal print head (TPH) 122 for transferring dyes onto the label surface of the optical disk 118 using thermal transfer. In a conventional photo-printer, a printer module includes a conveying unit for conveying a sheet of paper to be printed, together with a ribbon cartridge and a thermal printhead. However, in the present invention, since the optical disk drive unit 110 can convey the optical disk 118, the label printer module 120 does not require an additional conveying unit.

Figure 3:
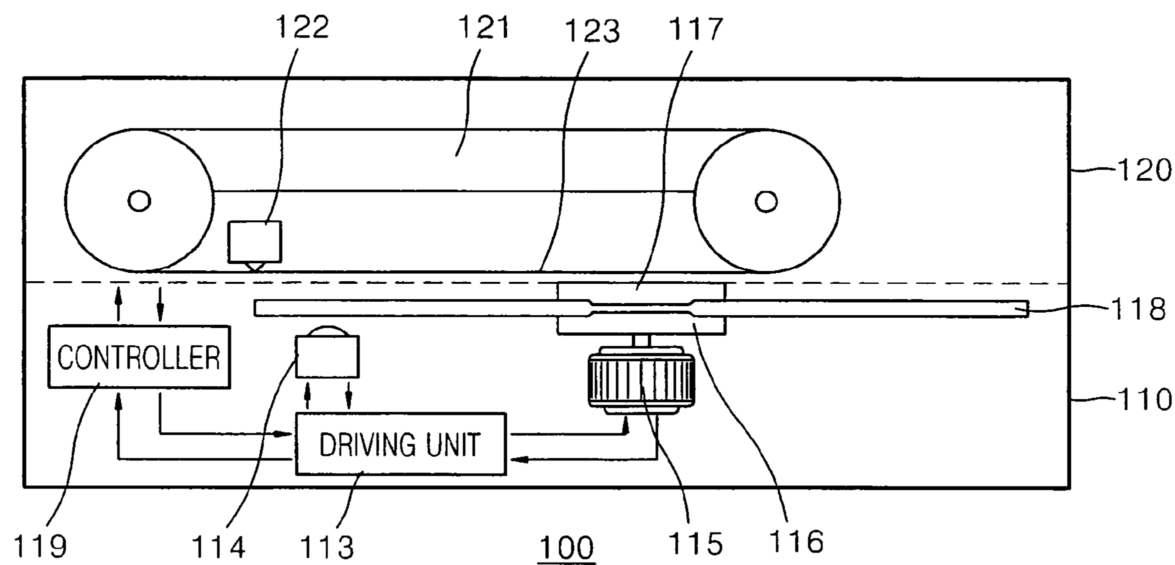
FIG. 3 is a schematic cross-sectional view of the optical recording/reproducing apparatus shown in FIG. 1.

FIG. 3 is a schematic cross-sectional view of the optical recording/reproducing apparatus 100 shown in FIG. 1. Referring to FIG. 3, the optical disk 118 mounted in the optical disk drive unit 110 is put on a turntable 116 and is chucked by a clamp 117. A driving unit 113 controls a driving motor 115 to rotate the optical disk 118. An optical pickup 114 performs focusing and tracking to record or reproduce information. A controller 119 controls the entire operation of the optical recording/reproducing apparatus 100 including the operation of the optical disk drive unit 110 and the label printing operation of the label printer module 120.

The thermal transfer ribbon 123 of the label printer module 120 opposes the label surface of the optical disk 118, and a thermal printhead 122 is positioned on the thermal transfer ribbon 123. The thermal printhead 122 comprises a plurality of fine heating elements which are two-dimensionally arranged perpendicular to a direction in which the optical disk 118 is inserted/ejected (that is, a direction where the optical disk 118 is conveyed). That is, a plurality of heating elements are disposed in the thermal printhead 122 in the form of an array having a plurality of columns and rows. A printing resolution of the label printer module 120 is determined by the size, interval, and number of the heating elements. In addition, since the thermal printhead 122 does not move laterally but is fixed, the width of the thermal printhead 122 is equal to a diameter of the optical disk 118 so that the thermal printhead 122 can print the entire label surface of the optical disk 118.

The optical disk 118, an optical disk medium such as a CD, DVD, BD or HD-DVD. The present invention is not limited to any particular type of medium. In this case, the label surface of the optical disk 118 may be monochrome such as a white or light color surface. This is because, when labels are printed, if the label surface of the optical disk 118 is not a white or light color surface, a desired color after printing may not be created.

Figure 4:
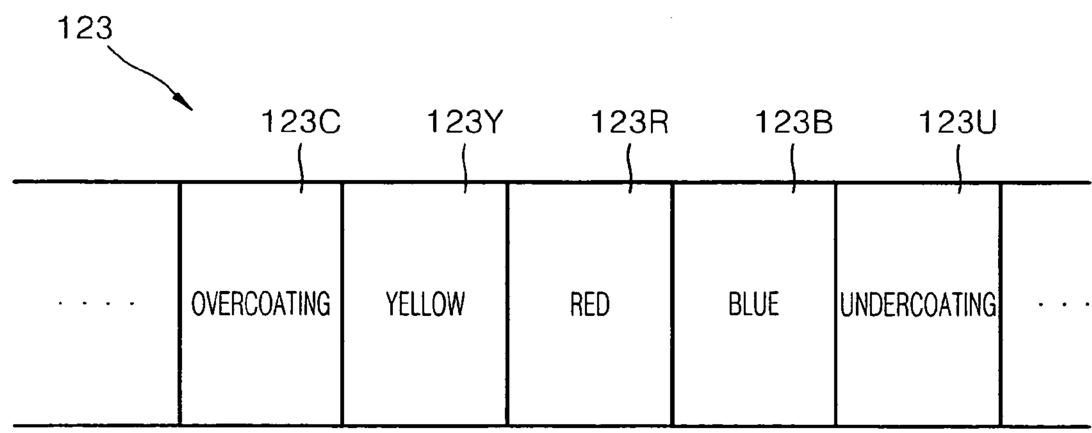
FIG. 4 illustrates the color arrangement of a thermal transfer ribbon used in a label printer module for printing a label on an optical disk, according to an embodiment of the present invention.
Figure 5:
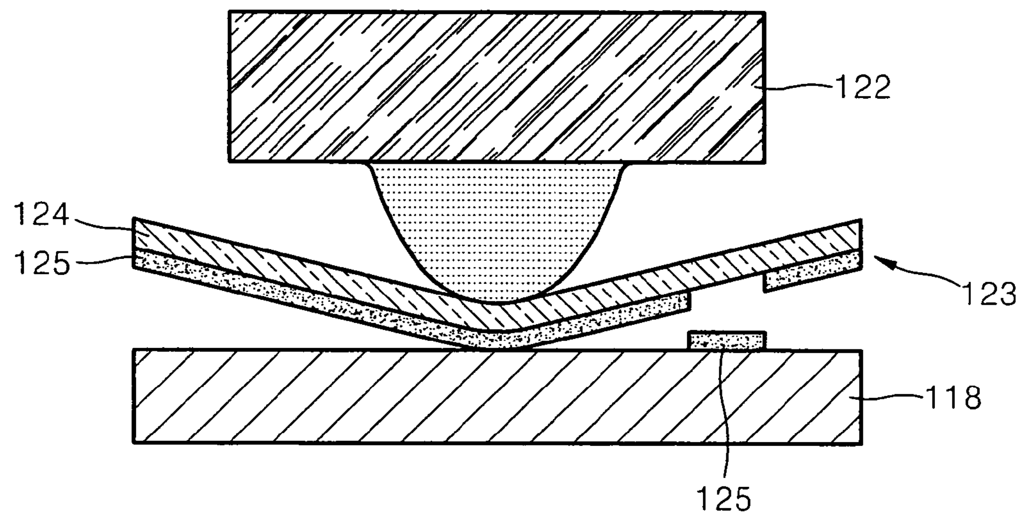
FIGS. 5 and 6 schematically illustrate the principle of printing labels on an optical disk according to an embodiment of the present invention.

In this embodiment of the present invention, to perform color label printing on the optical disk 118, the thermal transfer ribbon 123 comprises a plurality of dye regions of different colors. FIG. 4 illustrates the color arrangement of the thermal transfer ribbon 123. Referring to FIG. 4, the dye regions include three dye regions having yellow, red, and blue colors, which are three primary colors, that is, a yellow dye region 123Y, a red dye region 123R, and a blue dye region 123B, and an overcoating layer region 123C forming an overcoating layer on the label surface for protecting dyes transferred onto the label surface of the optical disk 118. In addition, the dye regions may further include an undercoating layer region 123U previously coated on the label surface of the optical disk 118 before the dyes are transferred onto the label surface of the optical disk 118 so that the dyes can be easily absorbed into the label surface of the optical disk 118. For example, when a printable disc having a label surface on which an ink-absorbing layer is formed is used, the thermal transfer ribbon 123 having no undercoating layer region 123U can be used. In addition, when a conventional optical disk is used, the thermal transfer ribbon 123 having the undercoating layer region 123U may be used. The dye regions are formed by attaching dyes 125 having respective colors onto a bottom surface of a very thin base film 124, as shown in FIG. 5.

When black-and-white label printing is performed on the optical disk 118, a thermal transfer ribbon including only one monochrome dye region (for example, black), an overcoating layer region, and an undercoating layer region may also be used. In addition, a thermal transfer ribbon including one monochrome dye region and an overcoating layer region may also be used.

In addition, the dye regions are repeatedly formed along a longitudinal direction of the thermal transfer ribbon 123, as shown in FIG. 4. Thus, the label printing is performed in such a way that the ribbon cartridge 121 conveys the thermal transfer ribbon 123 along the longitudinal direction at a uniform speed, the thermal printhead 122 transfers one monochrome dye onto the label surface of the optical disk 118 and then transfers dyes of a next color onto the label surface of the optical disk 118. In this case, a method of transferring dyes onto the label surface of the optical disk 118 includes a melting thermal transfer method by which dyes are melted and attached to the label surface and a sublimation thermal transfer method by which dyes are detached from the base film 124 by heat and then is sublimated on the label surface and is adhered thereto. In particular, in the case of the sublimation thermal transfer method, a layer for absorbing dyes into the label surface of the optical disk 118 is required, an undercoating layer region should be further formed in the thermal transfer ribbon 123 so as to use a conventional optical disk.

In order to realize different colors excluding three primary colors, dyes of three colors are transferred on the same position of the label surface at a predetermined ratio. Shading of respective colors may be adjusted according to a temperature of a heating element of the thermal printhead 122. For example, in order to realize black color, yellow, red, and blue color, dyes are transferred on the same position of the label surface at the same ratio. A portion in which dyes of any color are not transferred becomes an initial color of the label surface. Accordingly, preferably, the initial color of the label surface is white.

A label printing operation of the optical recording/reproducing apparatus 100 will now be described in greater detail.

Figure 7A:
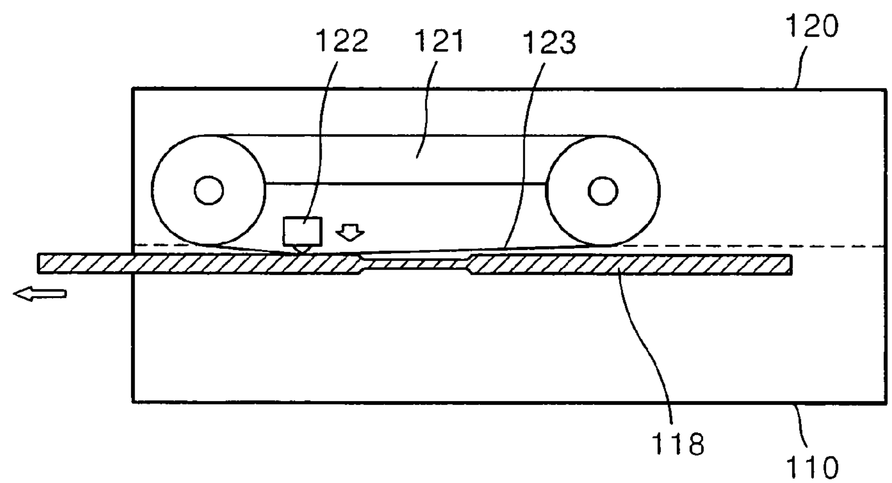
FIGS. 7A through 7C schematically illustrate an operation of an optical recording/reproducing apparatus for printing labels on an optical disk according to an embodiment of the present invention.

Referring to FIG. 7A, the controller 119 controls the optical disk drive unit 110 to eject the optical disk 118 at a predetermined speed. In the case of slot-in type optical disk drives, a loading motor (not shown) is rotated and an optical disk is ejected according to a well-known conveying mechanism. In the case of tray type optical disk drives, a disk tray (not shown) on which the optical disk 118 is mounted is moved out from the optical disk drive unit 110 by the loading motor. In this case, the optical disk 118 should be ejected at a speed corresponding to a printing speed of the label printer module 120. The ejecting speed of the optical disk 118 may be controlled by a rotating speed of the loading motor, for example.

Simultaneously, the controller 119 instructs the label printer module 120 to perform label printing. Then, the ribbon cartridge 121 of the label printer module 120 conveys the thermal transfer ribbon 123 at a predetermined speed, and the thermal printhead 122 presses and heats the thermal transfer ribbon 123 toward the label surface of the optical disk 118, as shown in FIG. 5. Then, the dyes 125 attached to the base film 124 of the thermal transfer ribbon 123 are transferred onto the label surface of the optical disk 118. At this time, since the thermal printhead 122 makes only an up-down motion for pressing the thermal transfer ribbon 123 and is fixed in a direction where label printing is performed, a conveying speed of the thermal transfer ribbon 123 should coincide with the printing speed of the label printer module 120.

Figure 7B:
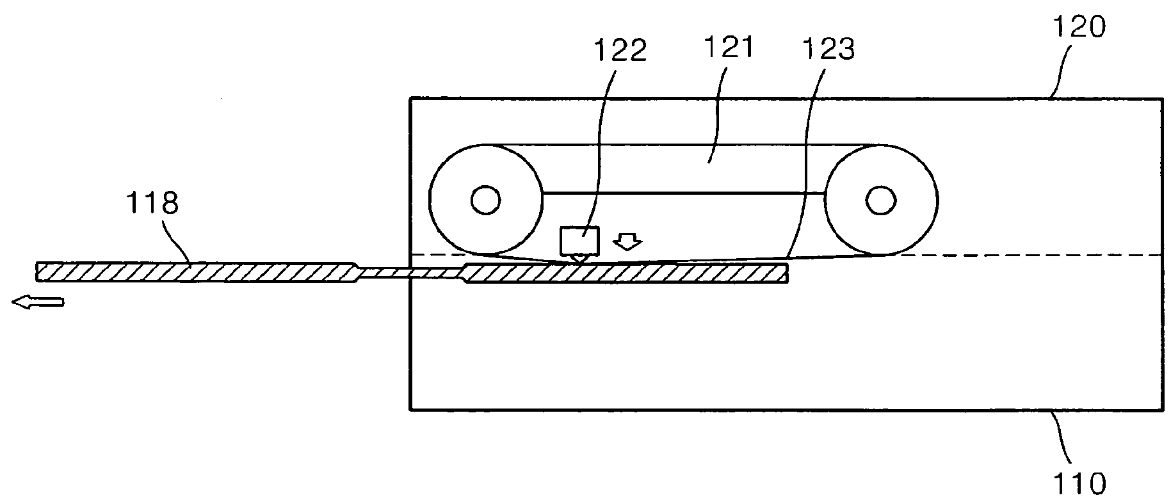

In this way, as shown in FIG. 7B, the optical disk 118 is continuously ejected and the entire label surface of the optical disk 118 is printed. If the thermal transfer ribbon 123 has the plurality of dye regions shown in FIG. 4, only dyes in one region when the optical disk 118 is ejected once is transferred onto the label surface of the optical disk 118. To this end, the width of each dye region of the thermal transfer ribbon 123 may be equal to or a little greater than a diameter of the optical disk 118. In addition, when the label printing begins, a front end of each dye region may coincide with a front end of the optical disk 118.

Figure 6:
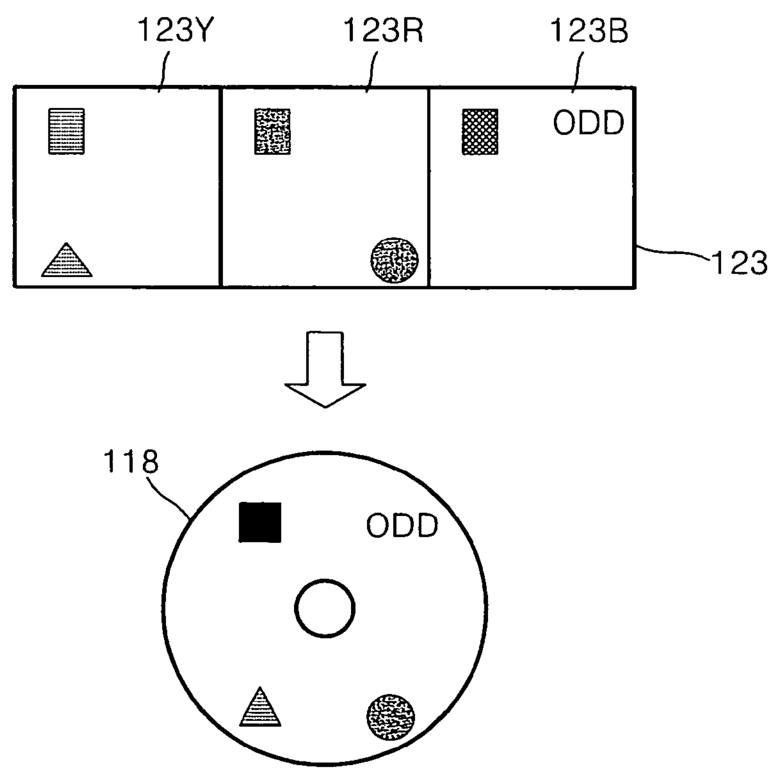
Figure 7C:
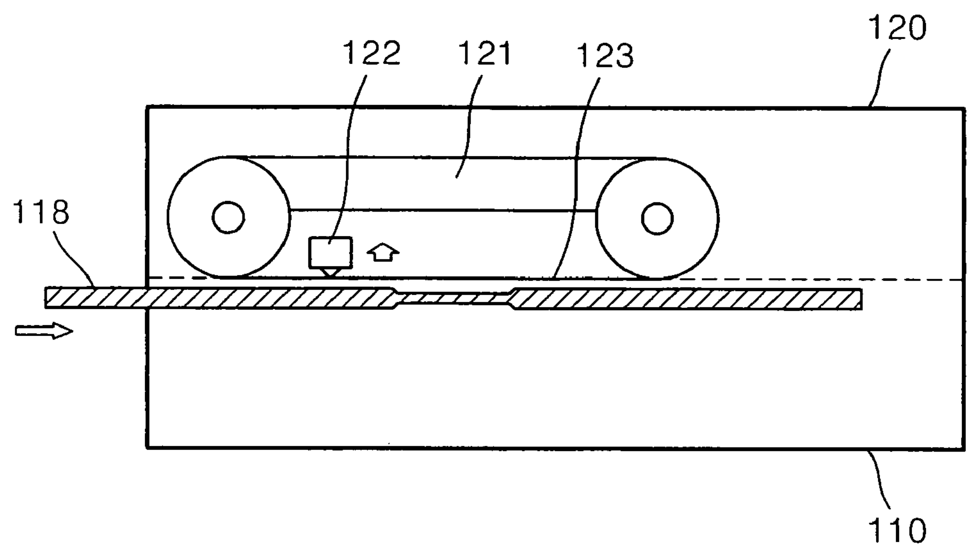

When label printing in one dye region is completed, to perform label printing in next dye region, as shown in FIG. 7C, the optical disk 118 is inserted again. After that, an operation of ejecting and inserting the optical disk 118 shown in FIGS. 7A through 7C is repeatedly performed until label printing in a last dye region is completed. For example, as shown in the upper part of FIG. 6, if dyes are transferred onto the label surface of the optical disk 118 in one dye region one after another, labels shown in the lower part of FIG. 6 are printed on the label surface of the optical disk 118. In the present invention, the order of transferred colors may vary, however, when an undercoating layer 123U exists, the undercoating layer 123U is first transferred. An overcoating layer 123C for protecting the transferred dyes is transferred after all of the other layers have been transferred. For example, when the optical disk 118 is initially ejected, the undercoating layer 123U may be transferred onto the label surface, dyes may be transferred in the order of yellow, red, and blue, and the overcoating layer 123C may be transferred onto the label surface so as to protect all the dyes transferred onto the label surface. Alternatively, without the undercoating layer 123U, the dyes are transferred in the order of yellow, red, and blue and lastly, the overcoating layer 123C may be transferred onto the label surface. Thus, when label printing is completed, the optical disk 118 is completely ejected.

In addition, when label printing is performed in black-and-white, when the optical disk 118 is initially ejected, the undercoating layer 123U may be transferred onto the label surface, one monochrome dye may be transferred, and the overcoating layer 123C may be transferred onto the label surface so as to protect all the dyes transferred.

According to an aspect of the present invention, label printing is possible even after label printing is performed once. That is, new labels can be overwritten on the label surface on which labels have already been printed. Thus, when labels are printed again on the optical disk 118 on which labels are already printed once, the above-described label printing operation is repeatedly performed. For example, after the undercoating layer 123U is transferred onto the label surface of the optical disk on which labels are printed, monochrome dyes or a plurality of dyes may be sequentially transferred and the overcoating layer 123C may be transferred last.

Figure 8:
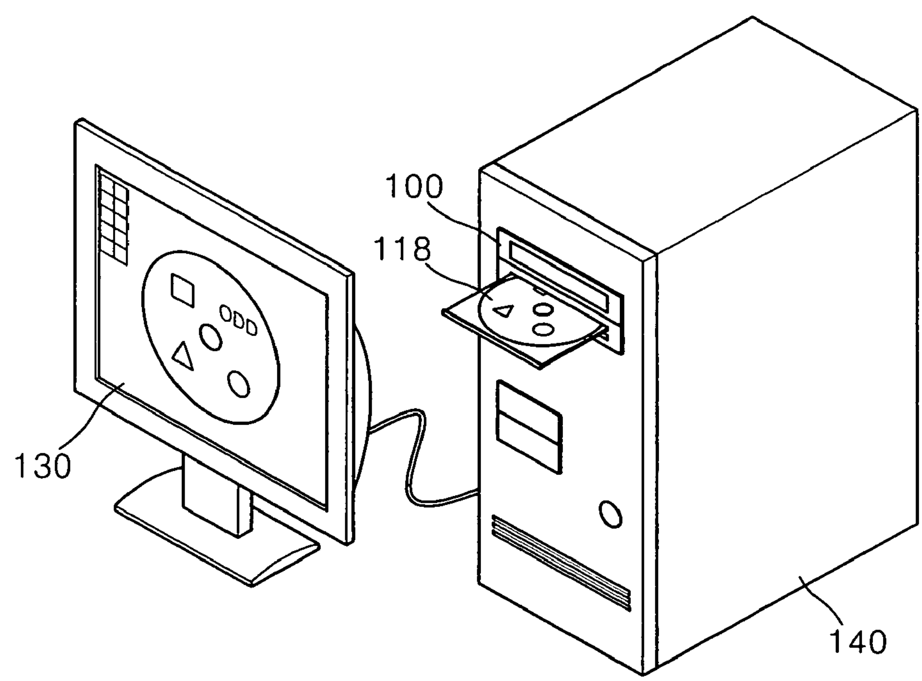
FIG. 8 illustrates an example in which labels are edited using a personal computer (PC) and the edited labels are printed on the optical disk according to an embodiment of the present invention.

FIG. 8 illustrates an example in which labels are edited using a personal computer (PC) and the edited labels are printed on the optical disk 118. As shown in FIG. 8, the optical recording/reproducing apparatus 100 may be of an embedded type, that is, mounted in a main body 140 of the PC. Then, a user may edit labels on a monitor 130 using a program such as a picture editor or dedicated label editor. After label printing is performed on the optical disk 118, the optical disk 118 having labels printed by the above-described operations is ejected from the optical recording/reproducing apparatus 100, as shown in FIG. 8. FIG. 8 shows the optical recording/reproducing apparatus 100 is of an embedded type. However, the optical recording/reproducing apparatus 100 may also be of an external type, that is, connected to an external terminal of the PC.

In the optical recording/reproducing apparatus having the label printer for printing labels on an optical disk according to an aspect of the present invention, a laser device is not used when label printing is performed and thus, a laser diode for recording/reproducing information on/from the optical disk is not degraded. In addition, since dyes are transferred using thermal transfer, an additional ink-absorbing layer does not need to be formed on the label surface of the optical disk, and new labels may also be printed on the surface on which labels have already been printed.

Furthermore, compared to the conventional art, a label printing time is comparatively short and color labels can be realized with high resolution. In addition, there is a small variation in the mass of the optical disk even after label printing such that an eccentricity or deflection of the optical disk does not occur when the optical disk is rotated.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical recording/reproducing apparatus having a label printer, and comprising:

an optical disk drive unit to record and reproduce information on a recording surface of an optical disk;

a label printer module to print labels on a label surface of the optical disk using thermal transfer in a printing operation; and a controller to control a label printing operation of the optical disk drive unit and the label printer module;

the label printer module comprising:

a ribbon cartridge on which a thermal transfer ribbon to which dyes are attached is wound and which is disposed to face the label surface of the optical disk mounted in the optical disk drive unit; and a thermal printhead to transfer the dyes attached to the thermal transfer ribbon onto the label surface of the optical disk using thermal transfer;

the thermal transfer ribbon comprising:

an undercoating layer region to absorb dyes, at least one dye region, and an overcoating layer region to form an overcoating layer on the label surface, to protect the dyes transferred onto the label surface of the optical disk, and wherein the thermal transfer ribbon is formed such that the undercoating layer region, the dye region, and the overcoating layer region are repeatedly formed along a longitudinal direction;

wherein the optical disk is repeatedly ejected from and inserted into the optical disk drive unit during the printing operation; and when the optical disk is initially ejected, the undercoating layer is transferred onto the label surface of the optical disk, the at least one dye is sequentially transferred while the optical disk is repeatedly re-inserted and ejected, and the overcoating layer is transferred after the at least one dye is sequentially transferred, such that when the overcoating layer is transferred last, the optical disk is completely ejected.

2. The optical recording/reproducing apparatus of claim 1, wherein the at least one dye region comprises a red dye region, a yellow dye region, and a blue dye region.

3. The optical recording/reproducing apparatus of claim 1, wherein, when labels are printed, the ribbon cartridge conveys the thermal transfer ribbon at a predetermined speed corresponding to a label printing speed.

4. The optical recording/reproducing apparatus of claim 1, wherein the thermal transfer ribbon is disposed between the thermal printhead and the label surface of the optical disk, and when labels are printed, the thermal printhead presses and heats the thermal transfer ribbon toward the label surface of the optical disk.

5. The optical recording/reproducing apparatus of claim 1, wherein the thermal printhead comprises a plurality of heating elements arranged perpendicular to a direction in which the optical disk is inserted and ejected.

6. The optical recording/reproducing apparatus of claim 5, wherein a width of the thermal printhead is equal to a diameter of the optical disk.

7. The optical recording/reproducing apparatus of claim 1, wherein the controller controls the optical disk drive unit to eject the mounted optical disk at a predetermined speed and controls the label printer module to print labels on the label surface of the optical disk.

8. The optical recording/reproducing apparatus of claim 7, wherein an ejecting speed of the optical disk is controlled to correspond to a label printing speed of the label printer module.

9. The apparatus of claim 1, wherein the apparatus is connected with a display unit, to allow a user to view and edit the labels printed on the label surface of the optical disk via the display unit, and the label printing module is controlled to overwrite the printed labels based upon the user's preference.

10. A method of printing labels on a label surface of an optical disk mounted in an optical disk drive unit using thermal transfer in an optical recording/reproducing apparatus comprising a label printer module including a ribbon cartridge on which a thermal transfer ribbon to which dyes are attached is wound and a thermal printhead, and the optical disk drive unit recording/reproducing information on a recording surface of an optical disk, the method comprising:

repeatedly ejecting and inserting the optical disk at a predetermined speed using the optical disk drive unit; and pressing and heating the thermal transfer ribbon toward the label surface of the optical disk using the thermal printhead and transferring dyes onto the label surface of the optical disk;

wherein the thermal transfer ribbon comprises an undercoating layer region for absorbing dyes, at least one dye region, and an overcoating layer region forming an overcoating layer on the label surface for protecting the dyes transferred onto the label surface of the optical disk, and wherein the thermal transfer ribbon is formed in such a way that the undercoating layer region, the dye region, and the overcoating layer region are repeatedly formed along a longitudinal direction; and when the optical disk is initially ejected, the undercoating layer is transferred onto the label surface of the optical disk, at least one dye is sequentially transferred while the optical disk is repeatedly re-inserted and elected, and the overcoating layer is transferred after the at least one dye is sequentially transferred, such that when the overcoating layer is transferred last, the optical disk is completely elected.

11. The method of claim 10, wherein an ejecting speed of the optical disk is controlled to correspond to a label printing speed of the label printer module.

12. The method of claim 11, wherein the ribbon cartridge conveys the thermal transfer ribbon at a predetermined speed corresponding to the label printing speed.

13. The method of claim 10, wherein the at least one dye region comprises a red dye region, a yellow dye region, and a blue dye region.

14. The method of claim 10, wherein the thermal transfer ribbon is disposed between the thermal printhead and the label surface of the optical disk, and when labels are printed, the thermal printhead presses and heats the thermal transfer ribbon toward the label surface of the optical disk.

15. The method of claim 14, wherein the thermal printhead comprises a plurality of heating elements arranged perpendicular to a direction in which the optical disk is inserted and ejected.

16. The method of claim 15, wherein a width of the thermal printhead is equal to a diameter of the optical disk.

17. A method for printing labels on a label surface of an optical disk mounted in an optical recording/reproducing apparatus, the optical recording/reproducing apparatus comprising a label printer module, the method comprising:

repeatedly ejecting and inserting the mounted optical disk at a predetermined speed; and printing labels on the label surface of the optical disk using thermal transfer;

wherein the label printer module comprises:

a ribbon cartridge on which a thermal transfer ribbon to which dyes are attached is wound and which is disposed to face the label surface of the optical disk mounted in the optical disk drive unit; and a thermal printhead to transfer the dyes attached to the thermal transfer ribbon onto the label surface of the optical disk using thermal transfer;

the thermal transfer ribbon comprising:

an undercoating layer region to absorb dyes, at least one dye region, and an overcoating layer region to form an overcoating layer on the label surface, to protect the dyes transferred onto the label surface of the optical disk, and wherein the thermal transfer ribbon is formed such that the undercoating layer region, the dye region, and the overcoating layer region are repeatedly formed along a longitudinal direction;

the printing labels on the label surface using thermal transfer further comprising:

transferring the undercoating layer onto the label surface when the optical disk is initially ejected;

sequentially transferring the at least one dye while the optical disk is repeatedly re-inserted and elected; and transferring the overcoating layer after the at least one dye is sequentially transferred, such that when the overcoating layer is transferred last, the optical disk is completely ejected.

18. The method of claim 17, wherein the optical recording/reproducing apparatus further comprises:

an optical optical disk drive unit recording/reproducing information on a recording surface of an optical disk.

19. The method of claim 18, wherein the printing of labels on the label surface of the optical disk using thermal transfer comprises pressing and heating the thermal transfer ribbon toward the label surface of the optical disk using the thermal printhead and transferring dyes onto the label surface of the optical disk.

20. The method of claim 18, wherein an ejecting speed of the optical disk is controlled to correspond to a label printing speed of the label printer module.

21. The method of claim 20, wherein the ribbon cartridge conveys the thermal transfer ribbon at a predetermined speed corresponding to the label printing speed.

22. The method of claim 17, further comprising:

viewing and editing the printed labels via a display unit; and overwriting the printed labels on the label surface of the optical disk.

23. An optical recording/reproducing apparatus having a label printer, and comprising:

an optical disk drive unit to record and reproduce information on a recording surface of an optical disk;

a label printer module to print labels on a label surface of the optical disk using thermal transfer in a printing operation; and a controller to control a label printing operation of the optical disk drive unit and the label printer module;

the label printer module comprising:

a ribbon cartridge on which a thermal transfer ribbon to which dyes are attached is wound and which is disposed to face the label surface of the optical disk mounted in the optical disk drive unit, the thermal transfer ribbon comprising: and a thermal printhead to transfer the dyes attached to the thermal transfer ribbon onto the label surface of the optical disk using thermal transfer;

the thermal transfer ribbon comprising:

at least one dye region and an overcoating layer region to form an overcoating layer on the label surface to protect the dyes transferred onto the label surface of the optical disk, and the thermal transfer ribbon is formed such that the at least one dye region and the overcoating layer region are repeatedly formed along the longitudinal direction;

wherein the optical disk is repeatedly ejected from and inserted into the optical disk drive unit during the printing operation; and when the optical disk is ejected once, dyes in one region are transferred onto the label surface of the optical disk, and ejecting and re-inserting of the optical disk is repeatedly performed up to a last dye region, and when the overcoating layer is transferred last, the optical disk is completely ejected.

24. A method of printing labels on a label surface of an optical disk mounted in an optical disk drive unit using thermal transfer in an optical recording/reproducing apparatus comprising a label printer module including a ribbon cartridge on which a thermal transfer ribbon to which dyes are attached is wound and a thermal printhead, and the optical disk drive unit recording/reproducing information on a recording surface of an optical disk, the method comprising:

repeatedly ejecting and inserting the optical disk at a predetermined speed using the optical disk drive unit; and pressing and heating the thermal transfer ribbon toward the label surface of the optical disk using the thermal printhead and transferring dyes onto the label surface of the optical disk;

wherein the thermal transfer ribbon comprises at least one dye region and an overcoating layer region forming an overcoating layer on the label surface to protect the dyes transferred onto the label surface of the optical disk, and the thermal transfer ribbon is formed such that the at least one dye region and the overcoating layer region are repeatedly formed along the longitudinal direction; and when the optical disk is ejected once, dyes in one region are transferred onto the label surface of the optical disk, and ejecting and re-inserting of the optical disk is repeatedly performed up to a last dye region, and when the overcoating layer is transferred last, the optical disk is completely ejected.

* * * * *